Figure 1:
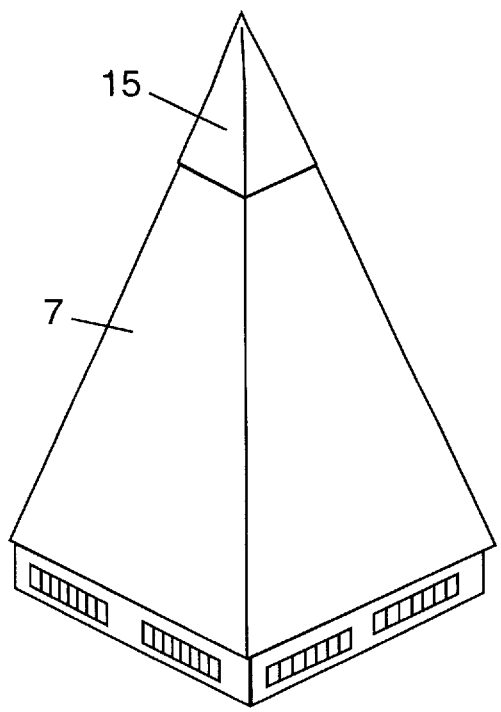

United States Patent
Krumsvik

Patent Number: 5,846,296
Date of Patent: Dec. 8, 1998

[54] METHOD AND DEVICE FOR RECOVERING WATER FROM A HUMID ATMOSPHERE

[76] Inventor: Per Kåre Krumsvik, Bjørkeveien 53, N-6880 Stryn, Norway

[21] Appl. No.: 809,700

[22] PCT Filed: Sep. 19, 1995

[86] PCT No.: PCT/NO95/00168

§ 371 Date: Mar. 17, 1997

§ 102(e) Date: Mar. 17, 1997

[87] PCT Pub. No.: WO96/09443

PCT Pub. Date: Mar. 28, 1996

[30] Foreign Application Priority Data

Sep. 23, 1994 [NO] Norway ................. 94 3534

[51] Int. Cl.⁶ ............................ B01D 53/04; B01D 53/26
[52] U.S. Cl. ............................ 95/115; 95/117; 95/126; 96/122; 96/126; 96/130; 96/143
[58] Field of Search ............ 95/114–126; 96/108, 96/121, 122, 126–130, 143, 146

[56] References Cited

U.S. PATENT DOCUMENTS

| | | | |
|---|---|---|---|
| 1,092,434 | 4/1914 | Daubiné | 95/125 |
| 2,138,687 | 11/1938 | Altenkirch | 95/122 X |
| 2,138,689 | 11/1938 | Altenkirch | 202/39 |
| 2,138,690 | 11/1938 | Altenkirch | 95/115 X |
| 2,138,691 | 11/1938 | Altenkirch | 95/115 X |
| 2,233,189 | 2/1941 | Altenkirch | 95/115 X |
| 2,462,952 | 3/1949 | Dunkak | 96/146 |
| 3,400,515 | 9/1968 | Ackerman | 55/179 |
| 4,146,372 | 3/1979 | Groth et al. | 55/33 |
| 4,185,969 | 1/1980 | Bulang | 95/120 |
| 4,219,341 | 8/1980 | Hussmann | 96/127 |
| 4,285,702 | 8/1981 | Michel et al. | 55/33 |
| 4,299,599 | 11/1981 | Takeyama et al. | 96/122 |
| 4,304,577 | 12/1981 | Ito et al. | 96/127 |
| 4,342,569 | 8/1982 | Hussman | 55/33 |
| 4,345,917 | 8/1982 | Hussmann | 95/125 |
| 4,374,655 | 2/1983 | Grodzka et al. | 96/126 X |
| 4,377,398 | 3/1983 | Bennett | 96/146 |
| 4,726,817 | 2/1988 | Roger | 95/115 |
| 5,069,688 | 12/1991 | Wells | 96/130 X |

FOREIGN PATENT DOCUMENTS

| | | | |
|---|---|---|---|
| 0016625 | 12/1934 | Australia | 95/122 |
| 378 976 | 10/1985 | Austria . | |
| 0019805 | 12/1980 | European Pat. Off. | 95/124 |
| 519 618 | 3/1931 | Germany . | |
| 2810241 | 9/1979 | Germany | 95/126 |
| 3208964 | 9/1983 | Germany | 95/117 |
| 33 13711 A1 | 10/1984 | Germany . | |
| 3525237 | 1/1987 | Germany | 95/126 |
| 38 20 744 A1 | 12/1989 | Germany . | |
| 39 36 977 A1 | 5/1991 | Germany . | |
| 4300001 | 7/1994 | Germany | 95/117 |
| 55-142517 | 11/1980 | Japan | 96/122 |
| 55-147126 | 11/1980 | Japan | 96/122 |
| 56-013017 | 2/1981 | Japan | 96/126 |
| 56-028622 | 3/1981 | Japan | 96/122 |
| 56-102923 | 8/1981 | Japan | 95/124 |
| 56-102924 | 8/1981 | Japan | 95/124 |
| 56-102925 | 8/1981 | Japan | 95/124 |
| 56-105724 | 8/1981 | Japan | 95/121 |
| 56-124424 | 9/1981 | Japan | 96/122 |
| 56-147611 | 11/1981 | Japan | 96/122 |
| 56-155616 | 12/1981 | Japan | 96/122 |
| 61-178015 | 8/1986 | Japan | 95/124 |
| 63-001418 | 1/1988 | Japan | 95/126 |

Primary Examiner—Robert Spitzer
Attorney, Agent, or Firm—Lynn & Lynn

[57] ABSTRACT

In a method for recovering and/or purifying water which is absorbed from a humid atmosphere, the moisture from the air is adsorbed on a suitable medium (3) in a defined space, whereupon by the application of heat the moisture is brought to a condenser (1) where it passes into a liquid state (10) and is collected in a suitable manner. In order to improve the efficiency of this method the defined, sealed space is opened for the adsorbing medium (3), for free access to air at night-time and is closed during the hot day-time period. Condensed water is passed out through a collecting funnel (2) and a channel (5) to a collection container (6). A device is also described in the form of a housing with walls (7) which can be opened and closed, in which there is located an adsorbing medium (3). In the upper part of the housing there is provided a condenser (1). The condenser (1) is equipped with a drop collector (2) which is connected to an outlet pipe (5) to a collection container (6).

13 Claims, 3 Drawing Sheets

METHOD AND DEVICE FOR RECOVERING WATER FROM A HUMID ATMOSPHERE

This application is a 35 USC371 case of PCT/NO95/00168, filed on Sep. 19, 1995.

A method for recovering and/or purifying water which is absorbed from a humid atmosphere, wherein the moisture from the air is adsorbed on a suitable medium in a defined space by means of cooling, whereupon by the application of heat to the medium in a closed room, the moisture is transferred to a condenser where it passes into a liquid state and is collected in a suitable manner.

The supply of water, and clean water in particular, has progressively become a serious problem in many parts of the world. The ground water level sinks, severe droughts occur, landscapes dry up and deserts spread. The water which exists in these areas is generally very highly polluted, which in turn can lead to disease among both people and animals, with infections which can result in major disasters. Lack of water has also caused the landscape to dry up with the consequent spread of the desert.

Many attempts have been made to supply such problem areas with water in some form or other, either by drilling to great depths, damming up and channelling water in particular directions, and attempts have also been made to utilize the moisture which exists in the atmosphere or the air. Furthermore plants have been developed for purifying sea water in order to provide drinking water.

With regard to the exploitation of the moisture in the air, reference is made to U.S. Pat. Nos. 4,285,702, 4,342,569 and 4,146,372. A device of the same kind for the production of drinking water is described in DE 3313711 A1. In these publications methods and devices are described for extracting water from the air, wherein an adsorption medium which is normally silica gel is employed in order to collect the moisture from the air, whereupon by means of heat the collected moisture is evaporated and then condensed in a condenser. For this purpose technical aids are employed in the form of evaporators and condensers together with forced air streams. The difference between day temperature and night temperature is also partially used in order to extract the moisture from the air. All of these known devices are based on the supply of a forced through-flow of air in order to achieve the desired capacity for the plant.

From U.S. Pat. No. 2,139,689 a plant for recovering humidity from the atmosphere is known. This plant consists of a house in which an absorbing material is stored which can absorb humidity from the air. This material is at night time transported out of the house and positioned into special areas in which it is resting during the night in order to absorb the humidity. At day time the material is transported back into the house which is closed and heated so that the humidity may evaporate and be condensed in the house. The plant according to the U.S. patent will require large space and efforts in order to transport the absorbing material in and out of a house.

Finally, it is in U.S. Pat. No. 3,400,516 described a further device for production of water from the atmosphere, in which a plurality of disks are used in order to provide a large surface area for absorbing humidity from the air. During the condensing step a cover is placed over the disks and water is condensed in the top area and passed out through a pipe from the top area.

The object of the present invention is to provide a method for recovering water from a humid atmosphere, wherein the method can be implemented with the simplest possible means and will be completely independent of external power sources, thus enabling the method to be implemented at any location whatever.

A further object of the invention is to provide a device for use in such a recovery process, which device should have a simple and economical construction with minimum maintenance requirements, thus enabling it too to be employed at any location whatever in a simple and reliable manner.

These objects are achieved with a method and a device of the type mentioned in the introduction, which are characterized by the features in the patent claims presented.

The invention is based on the known principles of adsorption of the moisture from the atmosphere and subsequent condensation thereof by cooling. The special feature of the method according to the invention is that this principle can be implemented by quite simply opening and closing a defined space in which the adsorbing medium is located This method can also be employed, e.g., in marshy areas, where the evaporation moisture from the marshy land can be utilized and this moisture can be purified, thus enabling the water to be used, e.g. as drinking water. The device is based on a space with walls which can be opened in the simplest possible manner, thus permitting the moisture from the environment to gain easy access to the adsorbing medium which is placed on trays in such a manner that the surface area of the medium is as large as possible. For this purpose a material of cellulose fibre is preferably used, e.g. ground or shredded waste paper from newspapers.

Figure 2:
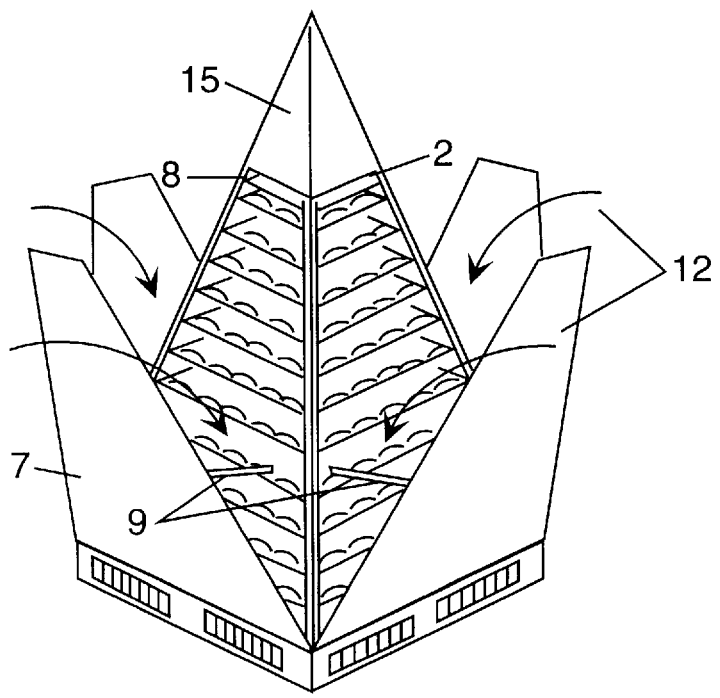
Figure 3:
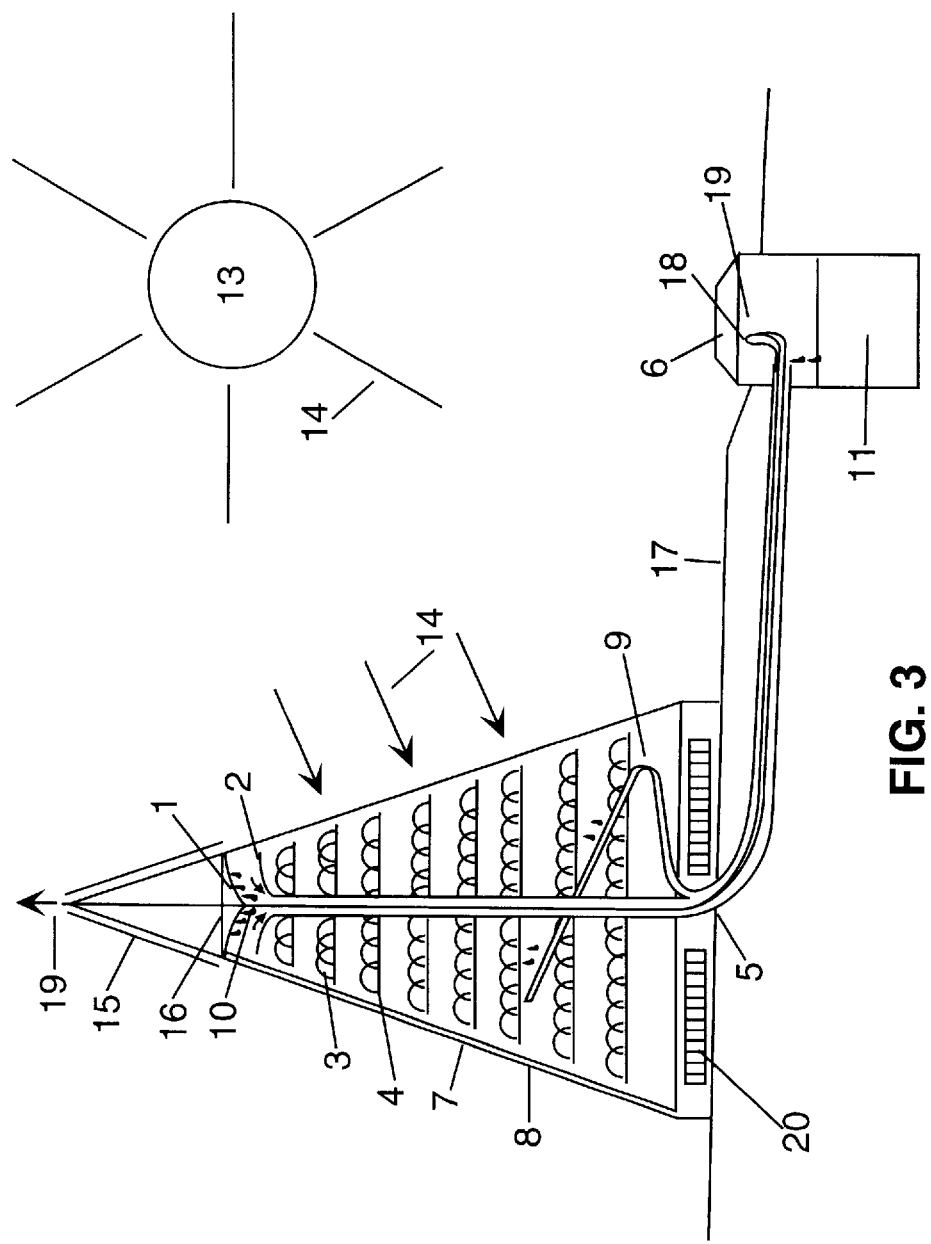
Figure 4:
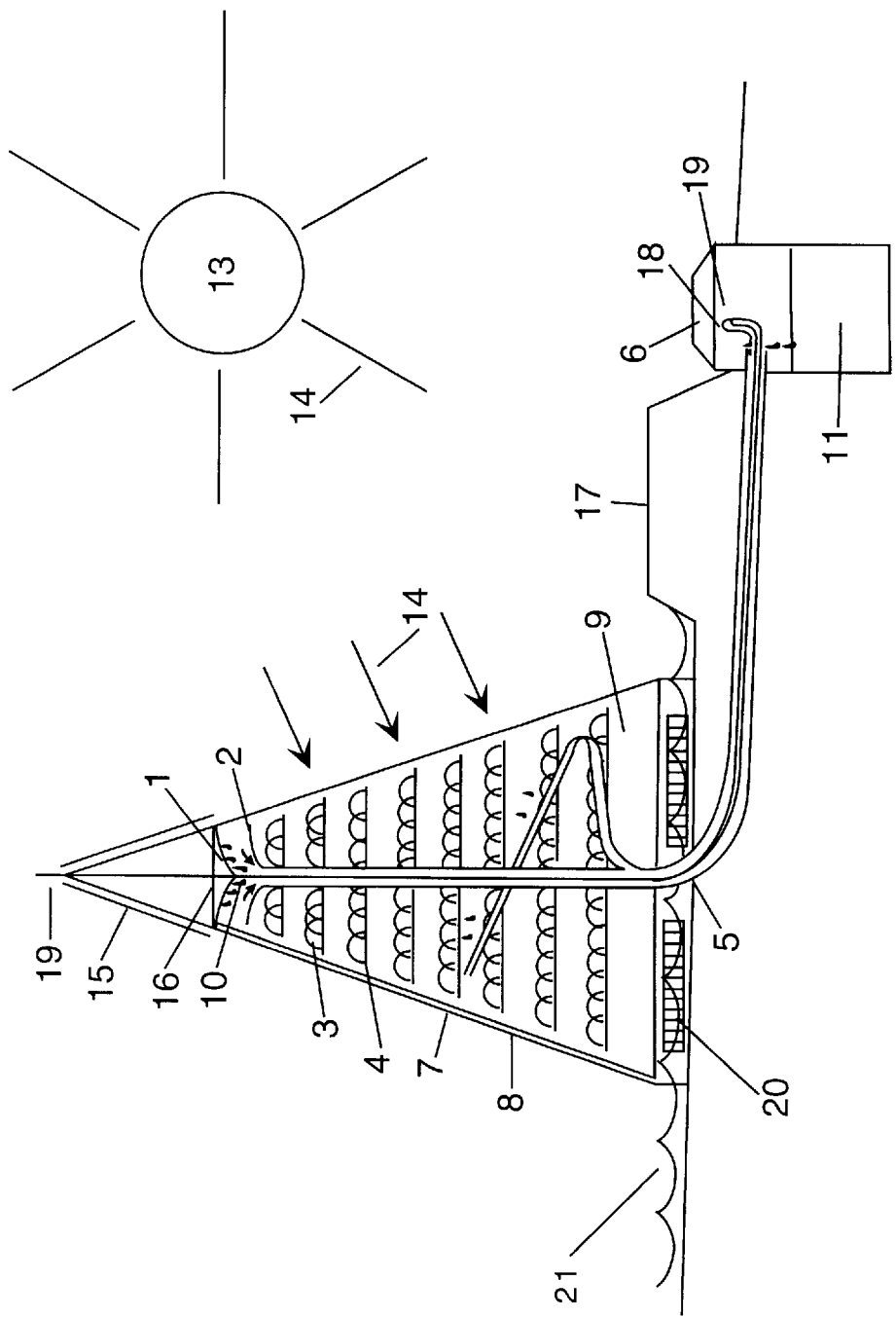

The invention will now be described in more detail by means of an embodiment which is illustrated in the drawing, in which:

FIG. 1 is a device according to the invention in a first operational position with a closed space, FIG. 2 is the device in FIG. 1 in the second operational position, with unfolded side walls, FIG. 3 is the device according to the invention in a section with a reservoir connected, and FIG. 4 is a sectional view corresponding to FIG. 3, with the device installed in a moist area.

In the drawing the invention is illustrated in a purely schematic fashion and the drawing is only intended to illustrate the principles of the invention, put in concrete form by a simple embodiment. This embodiment is in the form of a rectangular pyramid, but it should be obvious that many other shapes can also be employed, whether it be a polygonal pyramid with three walls or more walls; the device can be in the form of a circular cone, it can have partially straight walls and partially sloping walls, etc. Thus the external shape is not crucial for the invention, even though the illustrated embodiment has been shown to be very successful in practice and can be built up to very large sizes with a height of, e.g. 20 m.

In the illustrated embodiment, therefore, a pyramid with glass walls has been employed and the plant is connected to a reservoir.

The system is based on the use of cellulose fibre from ground up waste paper from newspapers as the adsorbing medium. Such cellulose fibre has an extreme capacity to absorb moisture and will also easily release moisture, while at the same time such a medium is very reasonably-priced. Alternatively, other adsorbing media naturally can also be used, e.g. silica gel according to the prior art, but the use of cellulose fibre is preferred in the invention as it also has a very large active surface. In the drawing the adsorbing medium is indicated by the reference numeral 3 and is arranged in a cell structure which can be in the form of a rack 8 with trays which are arranged in such a manner that a large amount of cellulose fibre 3 can be placed thereon while at the same time a sufficiently great distance is maintained between the layers in order to obtain the desired through-flow of air. The individual trays or levels in this cell structure are indicated by 4.

In the embodiment illustrated the actual housing which defines the space where the moisture is extracted from the atmosphere is in the form of a rectangular pyramid, where all sides are articulated at the lower edge, thus permitting each wall 7 to be unfolded or caused to open as illustrated in FIG. 2 as soon as the sun has set. This will provide free passage of night air with evening dew as indicated with arrows 12 which will have ample opportunity to penetrate the entire building and circulate through air flow the adsorption medium, i.e. the cellulose fibres which thereby absorb moisture.

When the sun rises again, i.e. when the day becomes hot, the walls 7 are returned to the position which is illustrated in FIG. 1 either manually or automatically and will thus provide a sealed space, i.e. a sealed pyramid, as shown in FIG. 1. The result is that the heat of the sun warms up the closed space and the sun shines in through the pyramid's glass walls 7, thus causing the moisture which was adsorbed by the cellulose fibres during the night to again evaporate. The water vapour created will thereby rise up in the inside of the walls 7 to the top of the space, indicated by 1 in FIGS. 3 and 4, which will act as a drop former, since the water vapour in this area will be condensed into drops, which are indicated by 10 in FIGS. 3 and 4. The transition from dew to drops occurs due to the pyramid's or the closed space's airtightness and the conical or pointed construction in the upper section. It has been shown that no further measures are required over and above this design in order to bring about the formation of drops. If it is desired to improve the efficiency in this area, the top area of the pyramid at 15 in FIG. 1 can be insulated, thus preventing this part of the space from being heated as intensively as the remaining part, or a cooling element can be provided here indicated by 16 in FIGS. 3 and 4. A cooling element of this kind can be driven by means of solar cells provided in the area 15. This kind of solar cell operation can also be used for automatic operation of the walls 7, causing them to be closed/unfolded.

The drops will consecutively drip down from the area 1 into a dropping funnel 2, or condensed drops will also follow the wall surfaces or be condensed on the walls and run down in the condensate gutter 9 which is located close against the glass walls 7. From these gutters 9 or from the dropping funnel 2 the water will be passed through a drainage pipe 5 to a collection point, e.g. a reservoir 11 from which water can then be drained off. Water which is collected in this manner will be clean and will be able to be used as drinking water.

By using a sealed reservoir 11 and an overpressure pipe 19 in the reservoir, possibly also a corresponding overpressure 19 in the top area of the space, it will be possible on the basis of the pressure conditions occurring in the sealed space during the evaporation process, to bring about an acceleration of the condensation of the moisture.

The reservoir 11 can be made accessible from the environment via a section 6 which projects above the surface. As shown in FIGS. 3 and 4, an upwardly directed end piece 18 can be provided at the end of the pipe 5.

At the end of the day all the moisture will be condensed from the adsorbing medium and the pyramid's or container's walls 7 are again unfolded to the position which is illustrated in FIG. 2 for a new intake of moisture.

The device according to the invention can be situated in practically any location and it has been shown that even in desert regions there is a relatively large amount of moisture in the air, which can be utilized for the recovery of water. The device can therefore be placed both in barren, dry locations and in moist areas. The device according to the invention is designed to be built on a very large scale, e.g. with a lateral length at the base of between 30 and 40 m and a correspondingly large height, which will be capable of collecting or forming several 10,000 of liters of water per day. Thus the device can be very easily adapted to suit an intended user.

Should the device according to the invention be placed, e.g. in a swampy area or in a sea water area, openings can be provided, e.g. in the form of control or flow valves 20 in the base section of the device. These valves can then be open for the through-flow of water which will also help to increase the moisture in the air in the sealed space. Alternatively, if the device is located in a dry area, these valves will contribute to the through-flow of air. FIG. 4 also illustrates schematically the positioning of the device in an area with abundant water, a water line 21 being outlined which, e.g., may also be sea water. This will cause an evaporation from sea water, while the condensate will be fresh water and will be able to be used as drinking water. In the drawing the effect of the sun on the device according to the invention is also indicated in FIGS. 3 and 4, the sun 13 being illustrated schematically with solar radiation 14 on the walls of the pyramid.

As mentioned above, the device according to the invention can also be designed in different shapes than the illustrated pyramidal form. Glass is referred to as the material in the walls of the device, since this will be the most favourable material and provide the most airtight walls possible. However, a design could also be envisaged in which the walls are of a different material, e.g. plastic and possibly also of aluminium. It is vital for evaporation and condensation that the walls are airtight in the closed phase. The drawing also illustrates that the walls can be unfolded about an axis of rotation located in the bottom section of the walls. This is also only a preferred embodiment, since the walls can also be hinged along the lateral edges or in some other way. The crucial factor here will be which method of moving the walls can be most easily implemented. With regard to the placing of the absorbing material, in the embodiment reference is made to placing it on trayes. This is only one possibility, and many other variants are conceivable. One such variant, e.g. is to place the absorbing material in sausage-like net stockings which are located beside one another in layers, and with the stockings crossing at right angles in succeeding layers. With nets of this kind or of a similar type the material in the individual layers can be kept together.

I claim:

1. A method for recovering and/or purifying water which is absorbed from a humid atmosphere, wherein the moisture from the air is adsorbed on a suitable medium (3) by means of cooling, whereupon by the application of heat to the medium (3) in a closed room, the moisture is transferred to a condenser (1) where it passes into a liquid state and is collected in a suitable manner, characterized in that the adsorbing medium (3) is provided on support means (4) within a pyramid shaped, sealed space (7, 8), with pivotable walls (7), which are opened by pivoting outwardly one or more, walls (7) of the room, the walls being pivoted from the lower end of the wall (7), thus providing free passage of air at night time, while the walls are being closed during the hot day time period, and that condensed water is passed out through a collecting means (9) to a collection container (11).

2. A method according to claim 1, characterized in that the pyramid shaped, sealed space (7, 8) is placed in a moist location, and that the moisture is permitted to pass through an area (20) at the bottom of the space.

3. A device for recovering and/or purifying water which is absorbed from a humid atmosphere, comprising moisture adsorbing means, means for evaporation of the adsorbed moisture, condensation means (1) at the upper part of the device and means for collecting (9) of the water formed, characterized in that:

the device is in the form of a housing (7, 8) in the interior of which there is permanently provided an absorbing medium (3) evenly distributed, so that the air may circulate around the medium, the housing (7, 8) having the shape of a pyramid with the narrowest part at the top (15) and with the wall (7) hinged in the lower area in order to be opened and closed, in the upper, narrow part (15) of the housing (7, 8) there is provided a condensation means (1), and the condensation means being equipped with a drop collector (5) and further collecting means (9) at the walls, which collecting means (5, 9) are connected to an outlet pipe to a collection container (11).

4. A device according to claim 3, characterized in that the adsorbing medium (3) is arranged evenly distributed at several heights, on trays (4) in the interior of the housing, or located in net envelopes which hold together the medium (3) in the individual layers.

5. A device according to claim 4, characterized in that the walls (7) are formed to comprise a light-penetrable material.

6. A device according to claim 5, characterized that the light-penetrable material is formed to comprise glass.

7. A device according to claim 5, characterized that the light-penetrable material is formed to comprise plastic.

8. A device according to claim 3, characterized in that a material with a large active surface is used as the adsorbing medium (3).

9. A device according to claim 8, characterized in that the medium (3) comprises cellulose fibre.

10. A device according to claim 9, characterized in that the cellulose fibre comprises waste paper from newspapers.

11. A device according to claim 3, characterized in that the condenser is provided in the form of a plate which is equipped with a cooling element (16), or is heat insulated in relation to the environment.

12. A device according to claim 3, characterized in that the upper area (15) of the housing (7, 8) has an area sealed against the environment in which there are provided solar cells for operation of the movement of the walls (7) and/or operation of the cooling element (16) in the condenser.

13. A device according to claim 3, characterized in that the lower area of the housing's walls (7) is provided with gutters (9) for collection of condensate from the wall surfaces.

* * * * *